US008077292B2

(12) United States Patent
Kitamura et al.

(10) Patent No.: US 8,077,292 B2
(45) Date of Patent: Dec. 13, 2011

(54) PROJECTION EXPOSURE METHOD

(75) Inventors: Yosuke Kitamura, Yokohama (JP);
Masaki Satake, Yokohama (JP); Shoji Mimotogi, Yokohama (JP); Kazuya Fukuhara, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 478 days.

(21) Appl. No.: 12/395,513

(22) Filed: Feb. 27, 2009

(65) Prior Publication Data
US 2009/0244504 A1 Oct. 1, 2009

(30) Foreign Application Priority Data

Mar. 25, 2008 (JP) ................................. 2008-078601

(51) Int. Cl.
*G03B 27/52* (2006.01)
(52) U.S. Cl. ................ 355/77; 355/67; 716/55
(58) Field of Classification Search .................... 355/67, 355/77; 716/55
See application file for complete search history.

(56) References Cited

U.S. PATENT DOCUMENTS

| | | | | |
|---|---|---|---|---|
| 5,895,741 A * | 4/1999 | Hasegawa et al. | ................ | 430/5 |
| 6,778,275 B2 * | 8/2004 | Bowes | ................ | 356/400 |
| 7,463,367 B2 * | 12/2008 | Bowes | ................ | 356/604 |
| 7,506,299 B2 * | 3/2009 | Socha et al. | ................ | 716/132 |
| 7,552,416 B2 * | 6/2009 | Granik et al. | ................ | 716/50 |
| 7,625,678 B2 * | 12/2009 | Misaka | ................ | 430/5 |
| 7,684,014 B2 * | 3/2010 | Sewell et al. | ................ | 355/67 |
| 7,774,736 B2 * | 8/2010 | Broeke et al. | ................ | 716/53 |
| 2003/0156276 A1 * | 8/2003 | Bowes | ................ | 356/124 |
| 2004/0029023 A1 * | 2/2004 | Misaka | ................ | 430/5 |
| 2004/0239934 A1 * | 12/2004 | Bowes | ................ | 356/400 |
| 2006/0098183 A1 * | 5/2006 | Sato et al. | ................ | 355/71 |
| 2008/0070131 A1 * | 3/2008 | Yamazoe | ................ | 430/5 |
| 2008/0129973 A1 * | 6/2008 | McCafferty et al. | ................ | 355/67 |

FOREIGN PATENT DOCUMENTS

| JP | 5-47626 | 2/1993 |
|---|---|---|
| JP | 5-198474 | 8/1993 |

OTHER PUBLICATIONS

Kitamura et al., "Patterning Performance for Contact Hole for 32nm Node HDSRAM Using Optimized Illumination Shape", Japan Applied Physics Conference, 1 page.

* cited by examiner

*Primary Examiner* — Edward Glick
*Assistant Examiner* — Thomas R Artman
(74) *Attorney, Agent, or Firm* — Finnegan, Henderson, Farabow, Garrett & Dunner, L.L.P.

(57) ABSTRACT

A projection exposure method that projects the shape of a hole onto a wafer by projecting a diffracted light, which is produced by applying light to a mask having a pattern for forming a hole pattern, onto the wafer through a projection optical system for exposure, wherein, in a plane substantially perpendicular to an optical axis, the light applied to the mask has a first intensity distribution in which the intensity is higher in the vicinity of eight apexes of an octagon centered at the optical axis than in other areas, the mask has a plurality of first opening patterns are arranged in a rectangular lattice configuration having sides parallel to diagonals of the octagon passing through the optical axis, and a plurality of second opening patterns are arranged in a face-centered rectangular lattice configuration having sides parallel to diagonals of the octagon passing through the optical axis.

12 Claims, 9 Drawing Sheets

PROJECTION EXPOSURE METHOD

CROSS-REFERENCE TO RELATED APPLICATION

This application is based upon and claims the benefit of priority from the prior Japanese Patent Application No. 2008-78601, filed on Mar. 25, 2008, the entire contents of which are incorporated herein by reference.

BACKGROUND OF THE INVENTION

1. Field of the Invention

The present invention relates to a projection exposure method used for forming a hole pattern.

2. Background Art

Recently, photolithography has made a dramatic advance. The numerical aperture (NA) of lenses has increased, the wavelength of the exposure light has been shortened, and thus, the resolution has been improved.

However, the increased NA of lenses and the shortened wavelength of the exposure light have led to reduction of the depth of focus (DOF), so that the practical resolution has not been significantly improved.

Thus, there is a demand for a technique of improving the DOF. For example, there is a technique of improving the resolution that involves sub-resolution assist features (SRAF), which are auxiliary patterns having a resolution equal to or less than the resolution limit, formed in a mask (reticle).

For example, a conventional projection exposure method uses an illumination intensity distribution in which the intensity is higher in the vicinity of apexes of an octagon (see Japanese Patent Laid-Open No. 5-47626, for example).

However, for the conventional projection exposure method described above, neither particular projection pattern arrangement nor particular SRAF arrangement is disclosed that allows efficient use of the illumination intensity distribution in which the intensity is higher in the vicinity of apexes of an octagon.

SUMMARY OF THE INVENTION

According to one aspect of the present invention, there is provided: a projection exposure method that projects the shape of a hole onto a wafer by projecting a diffracted light, which is produced by applying light to a mask having a pattern for forming a hole pattern, onto the wafer through a projection optical system for exposure, wherein, in a plane substantially perpendicular to an optical axis, the light applied to the mask has a first intensity distribution in which the intensity is higher in the vicinity of eight apexes of an octagon centered at the optical axis than in other areas, the mask has a plurality of first opening patterns are arranged in a rectangular lattice configuration having sides parallel to diagonals of the octagon passing through the optical axis, and a plurality of second opening patterns are arranged in a face-centered rectangular lattice configuration having sides parallel to diagonals of the octagon passing through the optical axis, directly opposite two apexes of the octagon lie on the same straight line passing through the optical axis and are opposite to each other at equal distances from the optical axis, and two straight lines passing through adjacent apexes of the octagon intersect with each other at the optical axis at an angle of 45 degrees, and the first diagonal line and the second diagonal line intersect with each other at the optical axis at an angle of 45 degrees.

According to further aspect of the present invention, there is provided: a projection exposure method that projects the shape of a hole onto a wafer by projecting a diffracted light, which is produced by applying light to a mask having a pattern for forming a hole pattern, onto the wafer through a projection optical system for exposure, wherein, in a plane substantially perpendicular to an optical axis, the light applied to the mask has a first intensity distribution in which the intensity is higher in the vicinity of eight apexes of an octagon centered at the optical axis than in other areas, the mask has a plurality of first opening patterns and a plurality of second opening patterns formed therein, a first auxiliary pattern is arranged on at least part of a straight line that is parallel with a first diagonal line of the octagon passing through the optical axis and passes through the center of a first opening pattern, and a second auxiliary pattern is arranged on at least part of a straight line that is parallel with a second diagonal line of the octagon passing through the optical axis and passes through the center of a second opening pattern, directly opposite two apexes of the octagon lie on the same straight line passing through the optical axis and are opposite to each other at equal distances from the optical axis, and two straight lines passing through adjacent apexes of the octagon intersect with each other at the optical axis at an angle of 45 degrees, and the first diagonal line and the second diagonal line intersect with each other at the optical axis at an angle of 45 degrees.

DETAILED DESCRIPTION

In the following, an embodiment of the present invention will be described with reference to the drawings.

Embodiment 1

Figure 1:
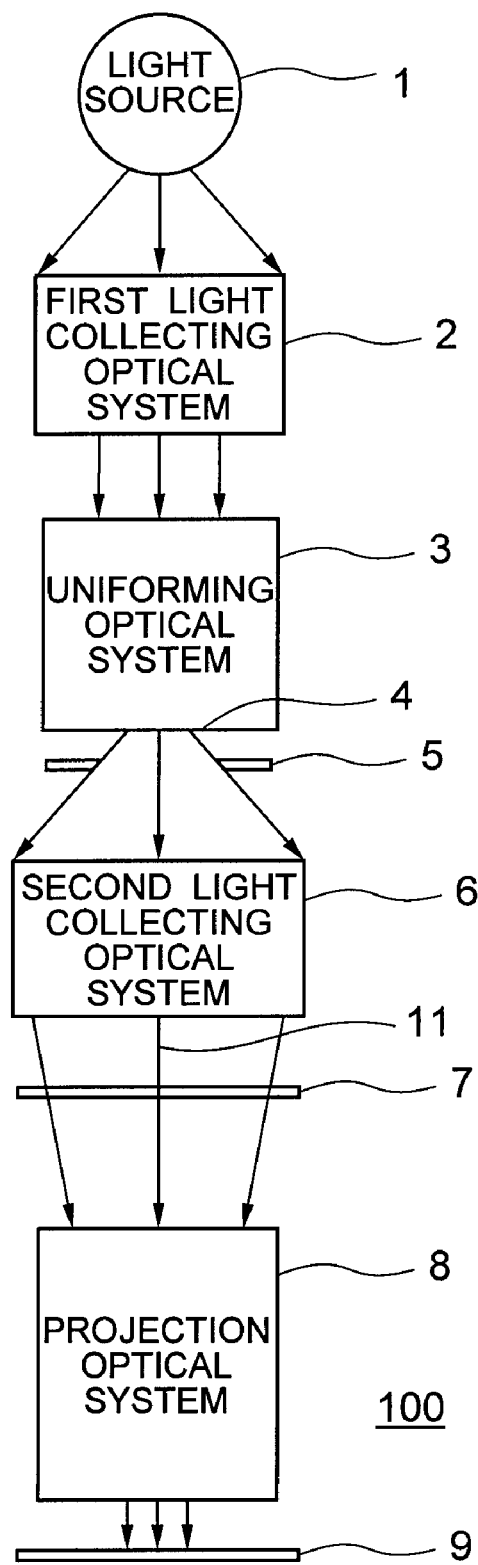
FIG. 1 is a diagram showing an essential configuration of a projection exposure apparatus 100 according to an embodiment 1 of the present invention.

FIG. 1 is a diagram showing an essential configuration of a projection exposure apparatus 100 according to an embodiment 1 of the present invention, which is an aspect of the present invention.

As shown in FIG. 1, the projection exposure apparatus 100 has a light source 1, a first light collecting optical system 2, a uniforming optical system 3, a secondary light source modulation filter 5, a second light collecting optical system 6, a mask (reticle) 7 and a projection optical system 8.

Light from the light source 1 is collected by the first light collecting optical system 2, which is constituted by an ellipsoidal reflecting mirror, an input lens or the like, and the collected light is uniformed by the uniforming optical system 3, which is constituted by an optical integrator or the like.

The secondary light source modulation filter 5 is disposed at a light emitting surface of the uniforming optical system 3. The light having passed through the secondary light source modulation filter is collected by the second light collecting optical system 6, which is constituted by an output lens, a collimating lens or the like, and the collected light is applied to the mask 7. The mask 7 has an opening pattern and an auxiliary pattern for forming a hole pattern.

The light applied to the mask 7 is diffracted by the mask 7, and the diffracted light (in other words, the light having passed through the mask 7) is projected onto a wafer 9 through the projection optical system 8 for exposure. In this way, the shapes of holes are projected onto the wafer 9.

In the case of the projection exposure apparatus 100 thus configured, the characteristics of the light incident on the mask 7 is the characteristics of the light that is emitted from the uniforming optical system 3 and passes through the second light collecting optical system 6. Furthermore, in general, the light emitting side of the uniforming optical system 3 is referred to as a secondary light source 4.

Figure 2:
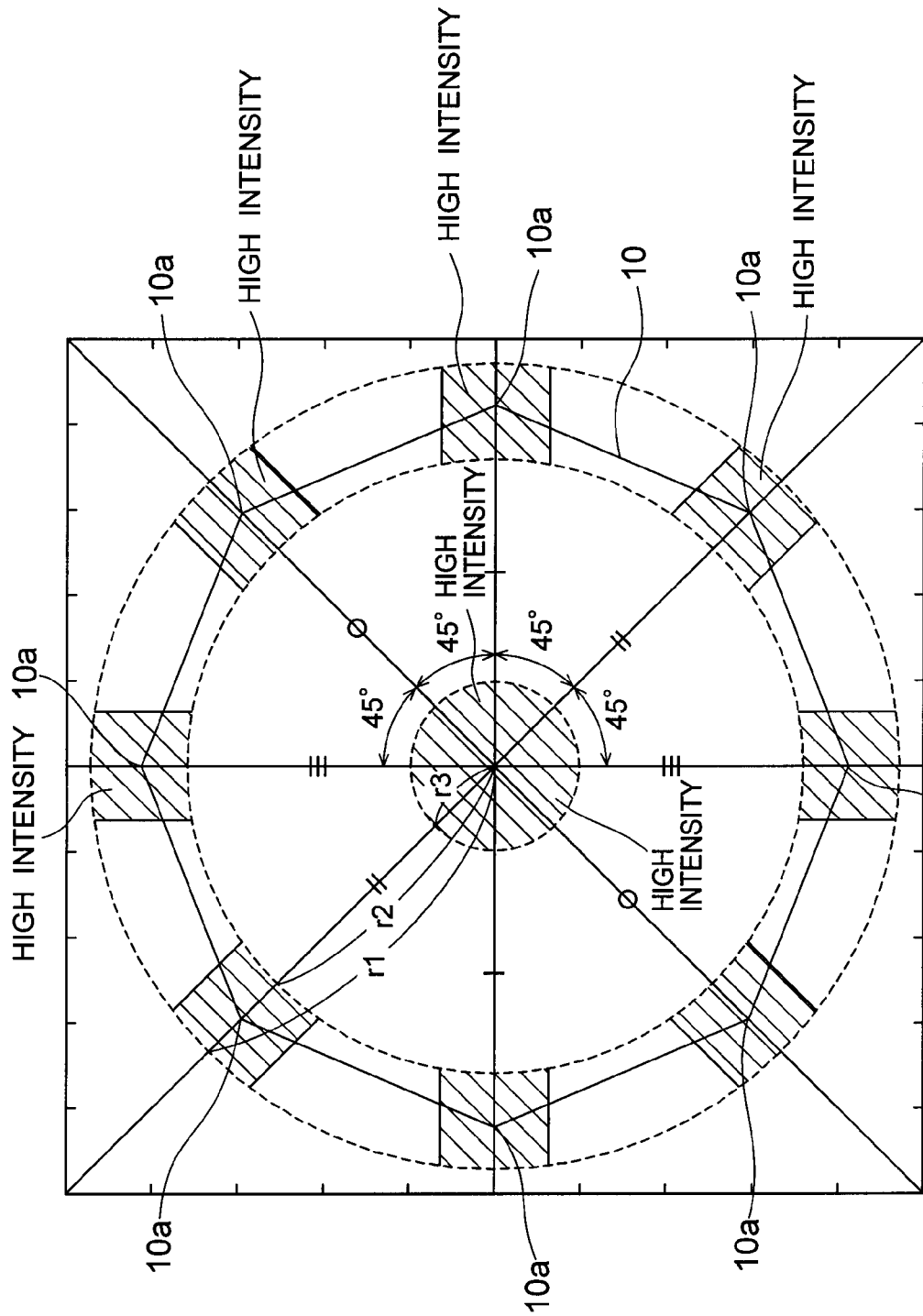
FIG. 2 is a diagram showing an example of the intensity distribution of the light applied to the mask (illumination profile) in a plane substantially perpendicular to the optical axis.

FIG. 2 is a diagram showing an example of the intensity distribution of the light applied to the mask (illumination profile) in a plane substantially perpendicular to the optical axis.

As shown in FIG. 2, in a plane substantially perpendicular to an optical axis 11, the light applied to the mask 7 (illumination) has a first intensity distribution in which the intensity is higher in the vicinities of eight apexes 10a of an octagon 10 centered at the optical axis 11 than in other areas.

In this embodiment, the areas having a higher light intensity in the first intensity distribution lie in an annular zone centered at the optical axis 11 and having an outer radius of r1 and an inner radius of r2.

In addition, in the plane substantially perpendicular to the optical axis 11, the light applied to the mask 7 has a second intensity distribution in which the intensity is higher in the vicinity of the optical axis 11 than in other areas.

In this embodiment, the area having a higher light intensity in the second intensity distribution lies in a circle centered at the optical axis 11 and having a radius of r3. However, the light applied to the mask 7 may not have the second intensity distribution.

Directly opposite two apexes 10a of the octagon 10 lie on the same straight line passing through the optical axis 11 and are opposite to each other at equal distances from the optical axis 11.

Two straight lines passing through adjacent apexes 10a of the octagon 10 intersect with each other at the optical axis 11 at an angle of 45 degrees.

The arrangement of the apexes 10a of the octagon 10 (the distance between opposite apexes 10a centering around the optical axis 11) changes depending on the arrangement of the patterns formed in the mask 7 (such as the ratio between the sides of a rectangular lattice described later).

In this embodiment, the octagon 10 is a regular octagon if the rectangular lattice described later is a square lattice, for example.

The projection exposure apparatus 100 is configured to apply the light having the intensity distribution (illumination profile) shown in FIG. 2 by controlling the transmittance distribution of the transmissive part of the secondary light source modulation filter 5.

Figure 3:
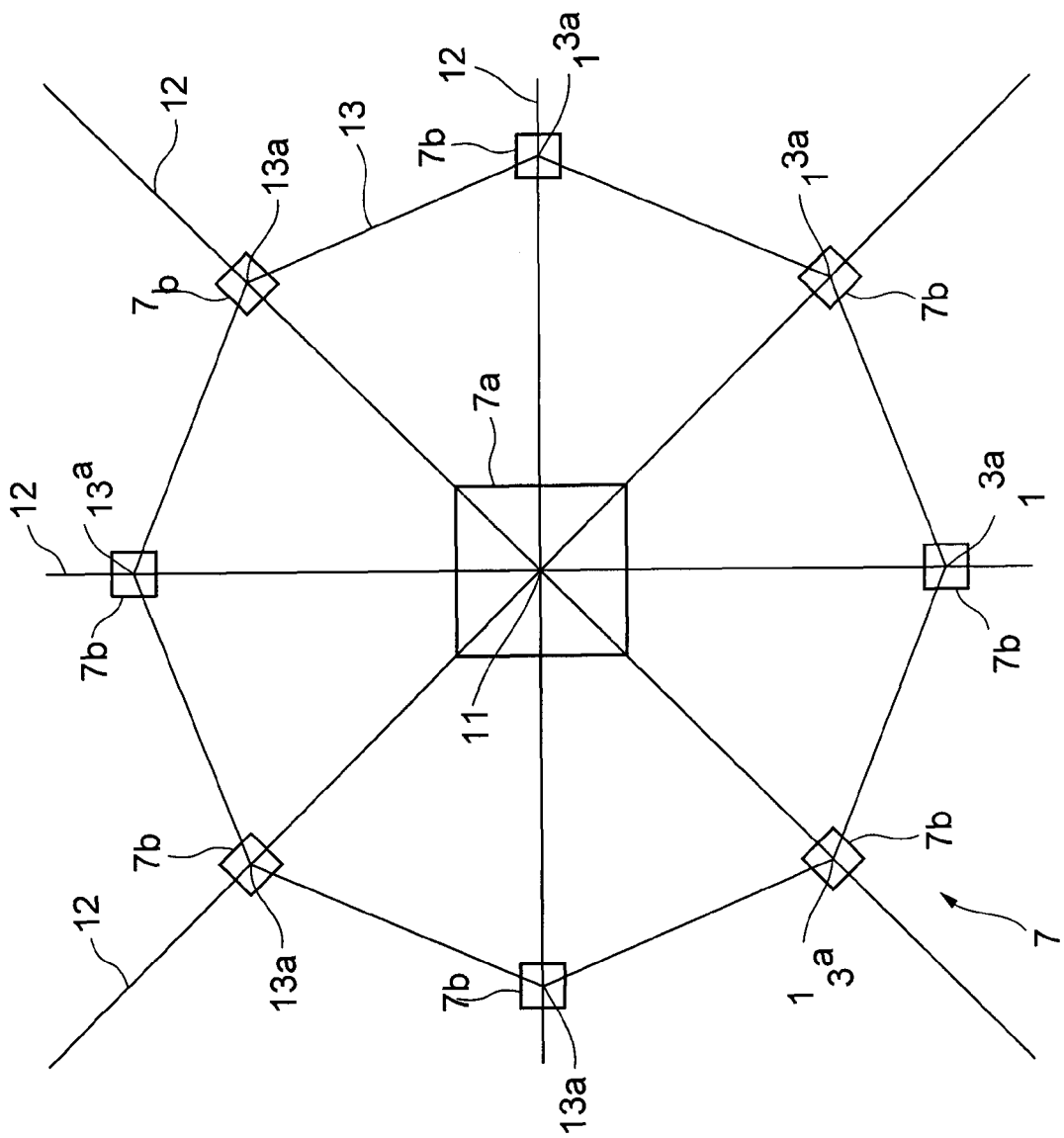
FIG. 3 is a diagram showing an example of patterns formed in the mask 7 of the projection exposure apparatus 100 shown in FIG. 1.

FIG. 3 is a diagram showing an example of patterns formed in the mask 7 of the projection exposure apparatus 100 shown in FIG. 1.

As shown in FIG. 3, in this embodiment, the mask 7 has an opening pattern 7a and auxiliary patterns 7b disposed on four straight lines 12 that are parallel with the diagonal lines of the octagon 10 passing through the optical axis 11 and pass through the center of the opening pattern 7a. In this embodiment, in particular, the auxiliary patterns 7b are disposed at eight apexes 13a of a regular octagon 13 centered at the opening pattern 7a.

The auxiliary patterns of the mask 7 can be disposed on at least part of the straight lines that are parallel with the diagonal lines of the octagon 10 passing through the optical axis 11 and pass through the center of the opening pattern 7a. As far as the condition is met, the shapes of holes can be projected on the wafer 9.

The opening pattern 7a of the mask 7 is formed in the area of the high light intensity in the second intensity distribution.

Next, advantages of a projection exposure method for the projection exposure apparatus 100 configured as described above will be described.

First, an example of the arrangement of the auxiliary patterns formed in the mask will be described.

Figure 4A:
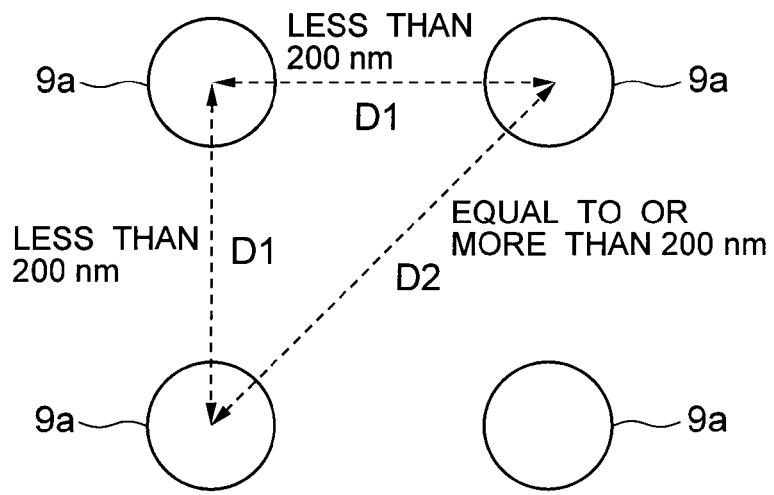
FIG. 4A is a diagram showing an example of patterns to be transferred onto the wafer in a case where the interval between the patterns is narrow.
Figure 4B:
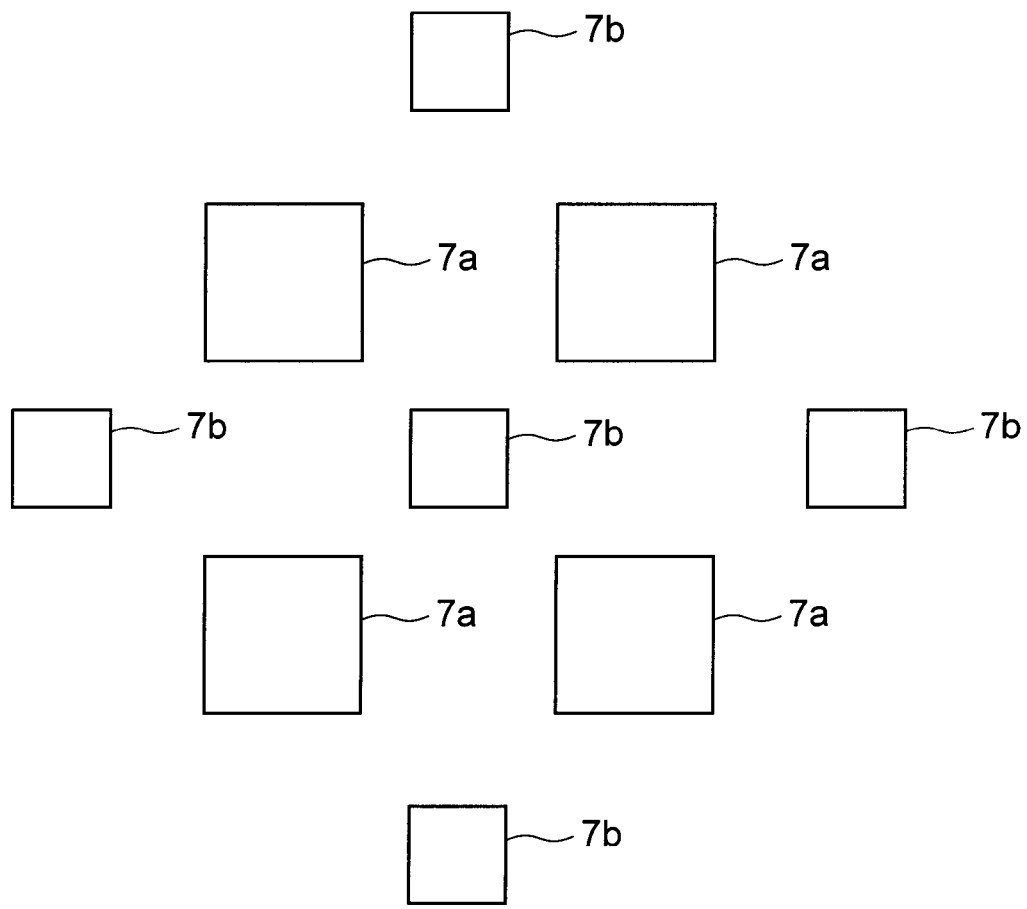
FIG. 4B is a diagram showing an example of the arrangement of auxiliary patterns (SRAF) formed in the mask for transferring the patterns shown in FIG. 4A.

FIG. 4A is a diagram showing an example of patterns to be transferred onto the wafer in a case where the interval between the patterns is narrow. FIG. 4B is a diagram showing an example of the arrangement of auxiliary patterns (SRAF) formed in the mask for transferring the patterns shown in FIG. 4A.

As shown in FIG. 4A, patterns 9a to be transferred onto the wafer are arranged in a rectangular lattice configuration (a square lattice configuration, in this example). The distance (pitch) "D1" between adjacent patterns 9a is smaller than 200 nm, and the distance "D2" between patterns 9a located at diagonally opposite corners of the lattice is equal to or larger than 200 nm.

To arrange the auxiliary patterns 7b, the interval between the patterns 9a has to be equal to or larger than 200 nm, for example. In this case, as shown in FIG. 4B, no auxiliary pattern 7b can be disposed between adjacent opening patterns 7a, and each auxiliary pattern 7b is disposed between two opening patterns 7a located at diagonally opposite corners of the lattice. That is, the opening patterns 7a and the auxiliary patterns 7b formed in the mask 7 are arranged in a face-centered rectangular lattice configuration (a staggered configuration). The face-centered rectangular lattice has sides parallel with diagonal lines of the octagon 10 shown in FIG. 2 passing through the optical axis 11.

Figure 5A:
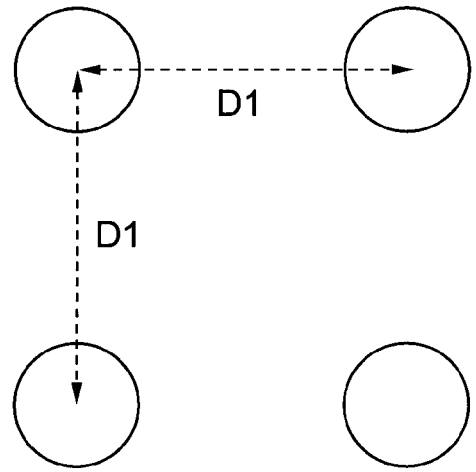
FIG. 5A is a diagram showing an example of patterns to be transferred onto the wafer in a case where the interval between the patterns is wide.
Figure 5B:
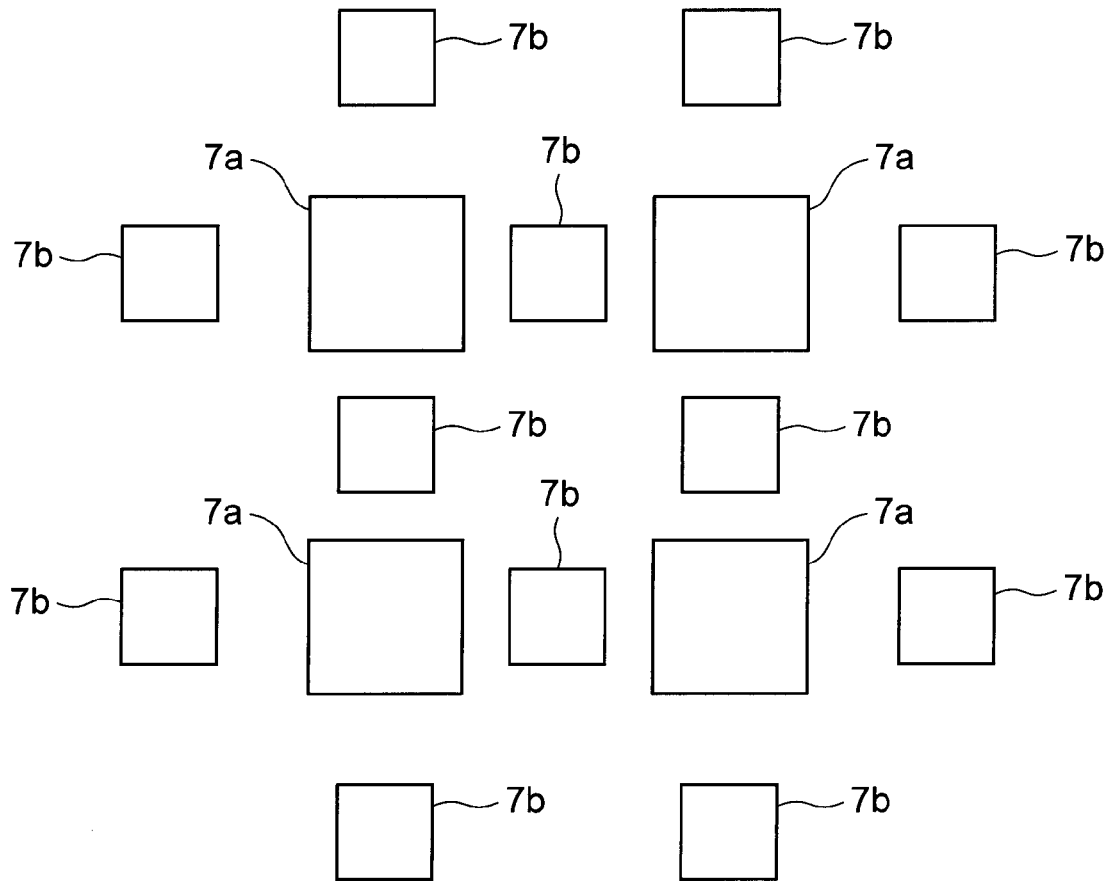
FIG. 5B is a diagram showing an example of the arrangement of auxiliary patterns (SRAF) formed in the mask for transferring the patterns shown in FIG. 5A.

On the other hand, FIG. 5A is a diagram showing an example of patterns to be transferred onto the wafer in a case where the interval between the patterns is wide. FIG. 5B is a diagram showing an example of the arrangement of auxiliary patterns (SRAF) formed in the mask for transferring the patterns shown in FIG. 5A.

As shown in FIG. 5A, patterns 9a to be transferred onto the wafer are arranged in a rectangular lattice configuration. The distance (pitch) "D1" between adjacent patterns 9a is equal to or larger than 200 nm and smaller than 300 nm.

Therefore, as shown in FIG. 5B, the auxiliary patterns 7b are disposed between adjacent opening patterns 7a. That is, the opening patterns 7a formed in the mask 7 are arranged in a rectangular lattice configuration (a square lattice configuration, in this example). That is, the opening patterns 7a formed in the mask 7 are arranged in a rectangular lattice configuration, and the auxiliary patterns 7b are arranged in a face-centered rectangular lattice configuration. The rectangular lattice has sides parallel with diagonal lines of the octagon 10 shown in FIG. 2 passing through the optical axis 11, and the face-centered rectangular lattice has sides inclined 45 degrees from the parallel sides of the rectangular lattice.

If the pitch between the patterns 9a is larger than 300 nm, a plurality of auxiliary patterns (SRAF) 7b can be disposed.

Then, the resist is exposed to illumination light having various illumination profiles (a normal illumination, an annular illumination, a quadrupole illumination and an octupole illumination (this embodiment)) using the mask having patterns arranged in the rectangular lattice configuration and in the face-centered rectangular lattice configuration, and the respective DOF characteristics are evaluated. The octupole illumination does not involve the second intensity distribution in which the intensity of light (illumination) is higher in the vicinity of the optical axis 11 shown in FIG. 2.

Figure 6:
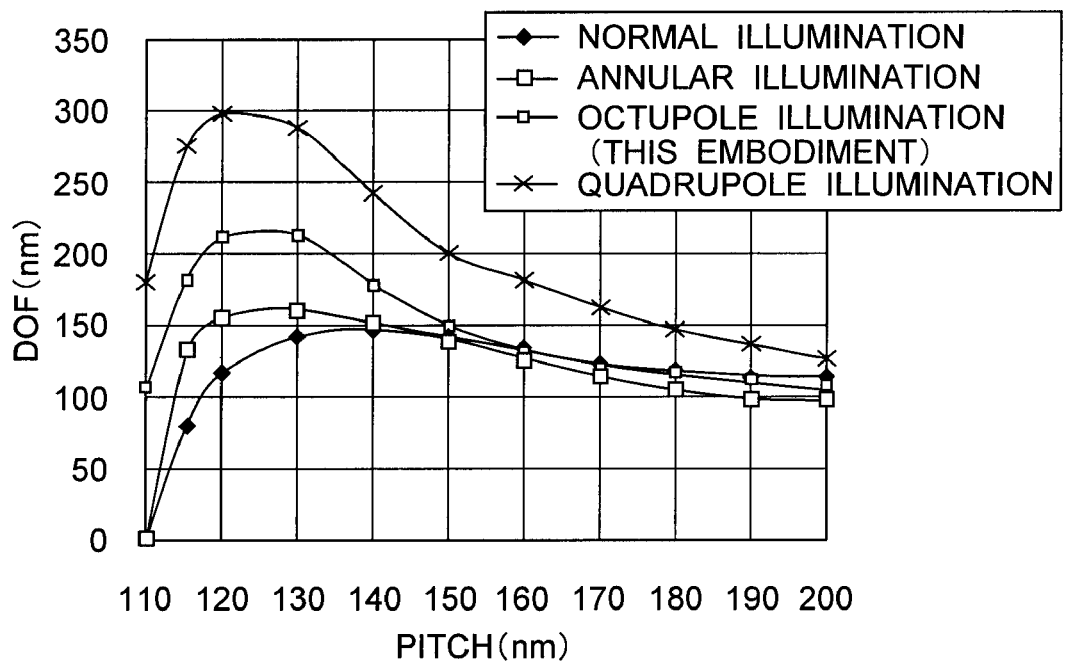
FIG. 6 is a graph showing relationships between the distance between the patterns formed on the wafer in the rectangular lattice configuration and the DOF.
Figure 7:
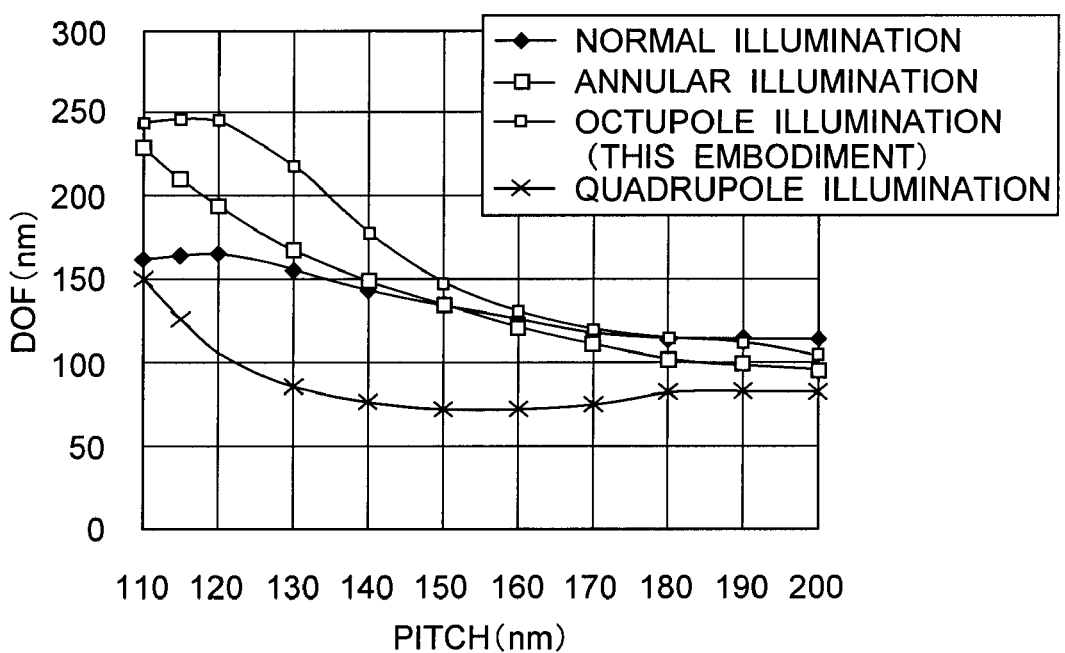
FIG. 7 is a graph showing relationships between the distance between the patterns formed on the wafer in the face-centered rectangular lattice configuration and the DOF.
Figure 8:
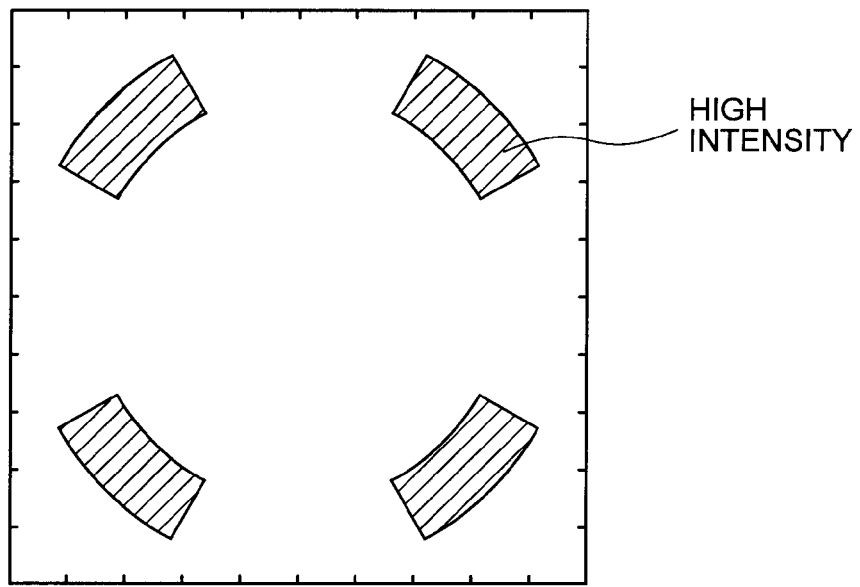
FIG. 8 is a diagram showing a comparison example of the intensity distribution of light (illumination profile) applied to the mask.

FIG. 6 is a graph showing relationships between the distance between the patterns formed on the wafer in the rectangular lattice configuration and the DOF. FIG. 7 is a graph showing relationships between the distance between the patterns formed on the wafer in the face-centered rectangular lattice configuration and the DOF. FIG. 8 is a diagram showing a comparison example of the intensity distribution of light (illumination profile) applied to the mask.

In FIGS. 6 and 7, for example, the DOF is evaluated on the assumption that only the opening patterns 7a are formed in the mask. The quadrupole illumination profile in the comparison example is adapted for the mask having patterns arranged in the rectangular lattice configuration as shown in FIG. 8.

Referring to FIG. 6, the quadrupole illumination profile in the comparison example provides the greatest DOF, and thus the characteristics thereof are good. The DOF of the octupole illumination profile in this embodiment is equal to or greater than that of the normal illumination profile and the annular illumination profile.

On the other hand, referring to FIG. 7, the quadrupole illumination profile in the comparison example provides the smallest DOF, and thus the characteristics thereof are deteriorated. However, the DOF of the octupole illumination profile in this embodiment is equal to or greater than that of the normal illumination profile and the annular illumination profile.

As can be seen from the above description, the projection exposure method according to this embodiment using the octupole illumination profile can improve the resolution of both the patterns formed in the face-centered rectangular lattice configuration on the wafer and the patterns formed in the rectangular lattice configuration on the wafer.

As described above, in FIGS. 6 and 7, for example, the DOF is evaluated on the assumption that only the opening patterns 7a are formed in the mask. However, similar characteristics result even if some of the opening patterns 7a are replaced with auxiliary patterns 7b.

Therefore, even if the masks having the auxiliary patterns 7b and the opening patterns 7a arranged as shown in FIGS. 4B and 5B described above are used, the projection exposure method according to this embodiment can appropriately project a desired pattern for exposure as far as the light applied to the mask has the illumination profile shown in FIG. 2.

Figure 9:
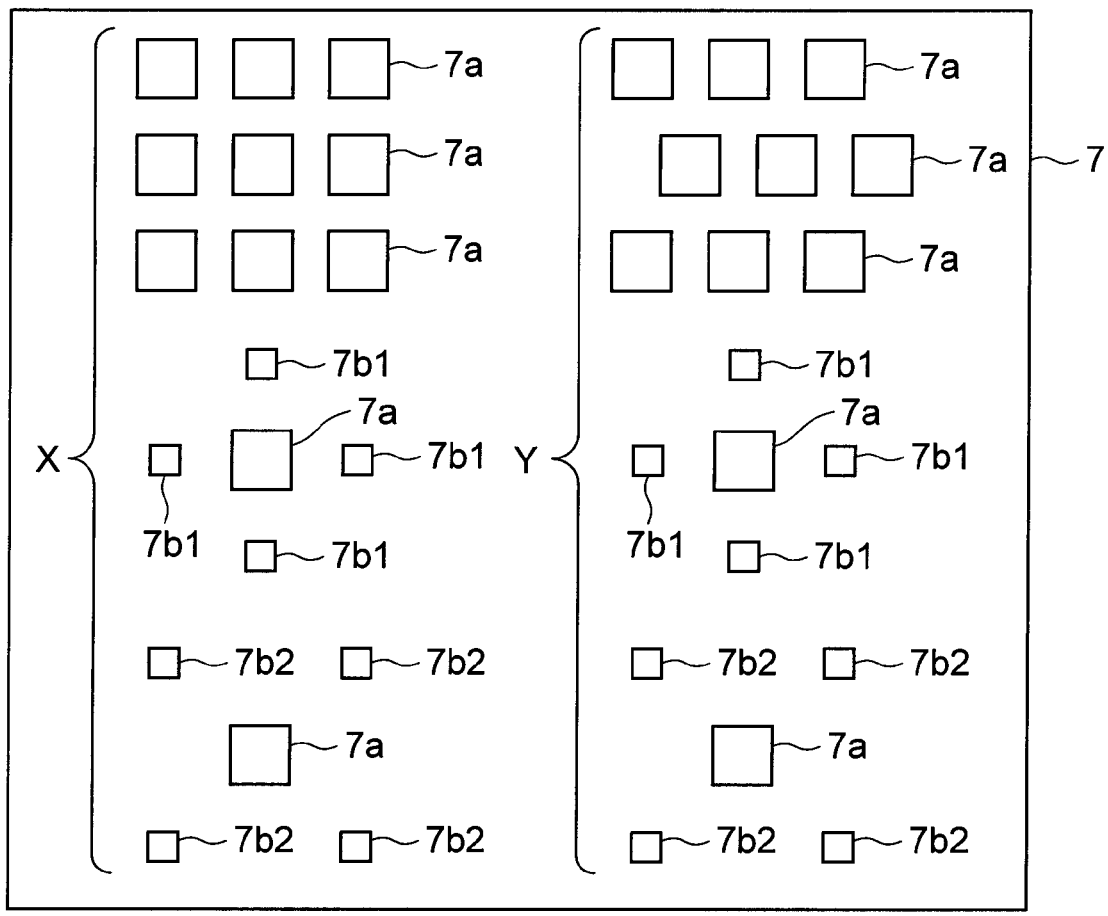
FIG. 9 is a diagram showing an example of the mask having patterns arranged in the face-centered rectangular lattice configuration and the rectangular lattice configuration.

FIG. 9 is a diagram showing an example of the mask having patterns arranged in the face-centered rectangular lattice configuration and the rectangular lattice configuration.

As shown in FIG. 9, in an area "X" of the mask 7, a plurality of opening patterns 7a are arranged in the rectangular lattice configuration.

Furthermore, in an area in the area "X" in which auxiliary patterns can be formed, auxiliary patterns 7b1 are arranged on a straight line that is parallel with a first diagonal line of the octagon 10 passing through the optical axis 11 and passes through the center of an opening pattern 7a. FIG. 9 shows auxiliary patterns 7b1 arranged on two orthogonal first diagonal lines (specifically, four auxiliary patterns 7b1).

Furthermore, in another area in the area "X" in which auxiliary patterns can be formed, auxiliary patterns 7b2 are arranged on a straight line that is parallel with a second diagonal line of the octagon 10 passing through the optical axis 11 and passes through the center of an opening pattern. FIG. 9 shows auxiliary patterns 7b2 arranged on two orthogonal second diagonal lines (specifically, four auxiliary patterns 7b2).

The first diagonal line and the second diagonal line intersect with each other at the optical axis 11 at an angle of 45 degrees.

Furthermore, as shown in FIG. 9, in an area "Y" of the mask 7, a plurality of opening patterns 7a are arranged in the face-centered rectangular lattice configuration.

Furthermore, in an area in the area "Y" in which auxiliary patterns can be formed, auxiliary patterns 7b1 are arranged on a straight line that is parallel with the first diagonal line of the octagon 10 passing through the optical axis 11 and passes through the center of an opening pattern 7a. FIG. 9 shows auxiliary patterns 7b1 arranged on the two orthogonal first diagonal lines (specifically, four auxiliary patterns 7b1).

Furthermore, in another area in the area "Y" in which auxiliary patterns can be formed, auxiliary patterns 7b2 are arranged on a straight line that is parallel with the second diagonal line of the octagon 10 passing through the optical axis 11 and passes through the center of an opening pattern. FIG. 9 shows auxiliary patterns 7b2 arranged on the two orthogonal second diagonal lines (specifically, four auxiliary patterns 7b2).

As described above, the rectangular lattice and the face-centered rectangular lattice have sides parallel to diagonals of the octagon 10 passing through the optical axis 11 shown in FIG. 2.

Figure 10:
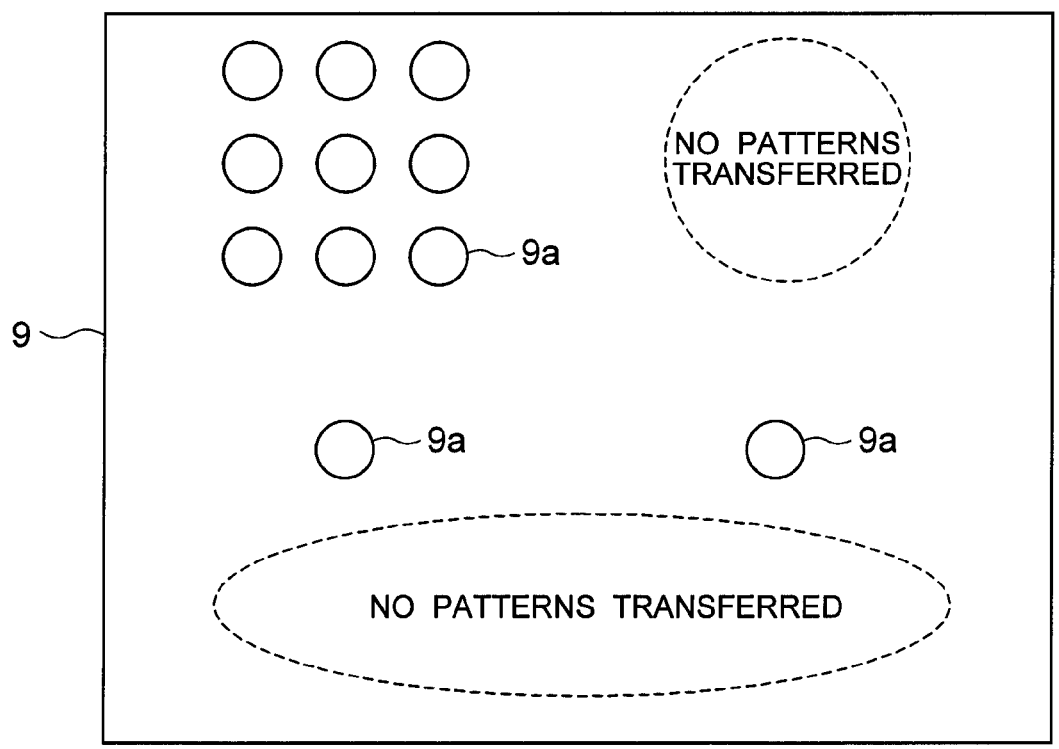
FIG. 10 is a diagram showing patterns transferred onto the wafer using the illumination having the quadrupole illumination profile in the comparison example and the mask shown in FIG. 9.
Figure 11:
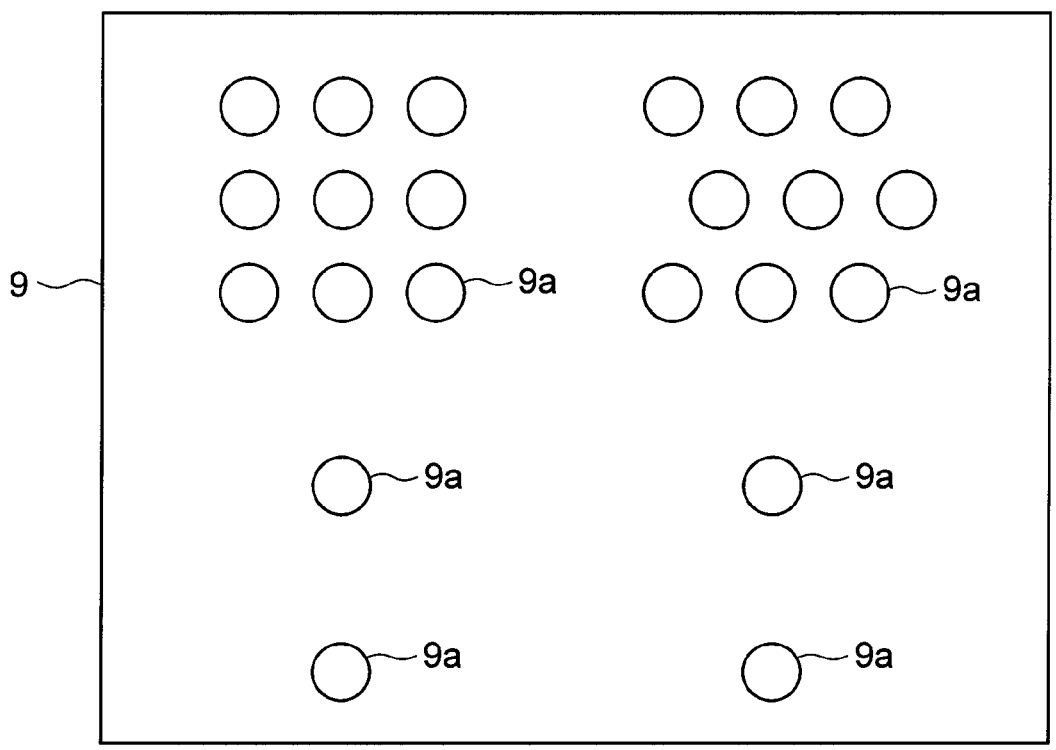
FIG. 11 is a diagram showing patterns transferred onto the wafer using the illumination having the octupole illumination profile in this embodiment and the mask shown in FIG. 9.

FIG. 10 is a diagram showing patterns transferred onto the wafer using the illumination having the quadrupole illumination profile in the comparison example and the mask shown in FIG. 9. FIG. 11 is a diagram showing patterns transferred onto the wafer using the illumination having the octupole illumination profile in this embodiment and the mask shown in FIG. 9.

Referring to FIG. 10, hole patterns 9a corresponding to the opening patterns 7a closely arranged in the rectangular lattice configuration in the area "X" of the mask 7 and hole patterns 9a corresponding to the opening patterns 7a around which the auxiliary patterns 7b1 are arranged are transferred.

In other words, hole patterns 9a corresponding to the opening patterns 7a closely arranged in the face-centered rectangular lattice configuration in the area "Y" of the mask 7 and hole patterns 9a corresponding to the opening patterns 7a around which the auxiliary patterns 7b2 are arranged are not transferred.

As described above, this is because the quadrupole illumination profile in the comparison example is designed for the mask having opening patterns arranged in the rectangular lattice configuration such as that shown in FIG. 8.

On the other hand, referring to FIG. 11, all the hole patterns 9a corresponding to the opening patterns 7a arranged in the rectangular lattice configuration in the area "X" of the mask 7 and the opening patterns 7a arranged in the face-centered rectangular lattice configuration in the area "Y" of the mask 7 are transferred.

Thus, the projection exposure method according to this embodiment projects the hole patterns 9a corresponding to the opening patterns 7a and the auxiliary patterns 7b onto the wafer 9 in one exposure.

Next, a result of research for more preferred illumination conditions will be described. In this case, the DOF characteristics is evaluated based on the presence or absence of the second intensity distribution in which the intensity of light (illumination) is higher in the vicinity of the optical axis 11 than in other areas.

Figure 12:
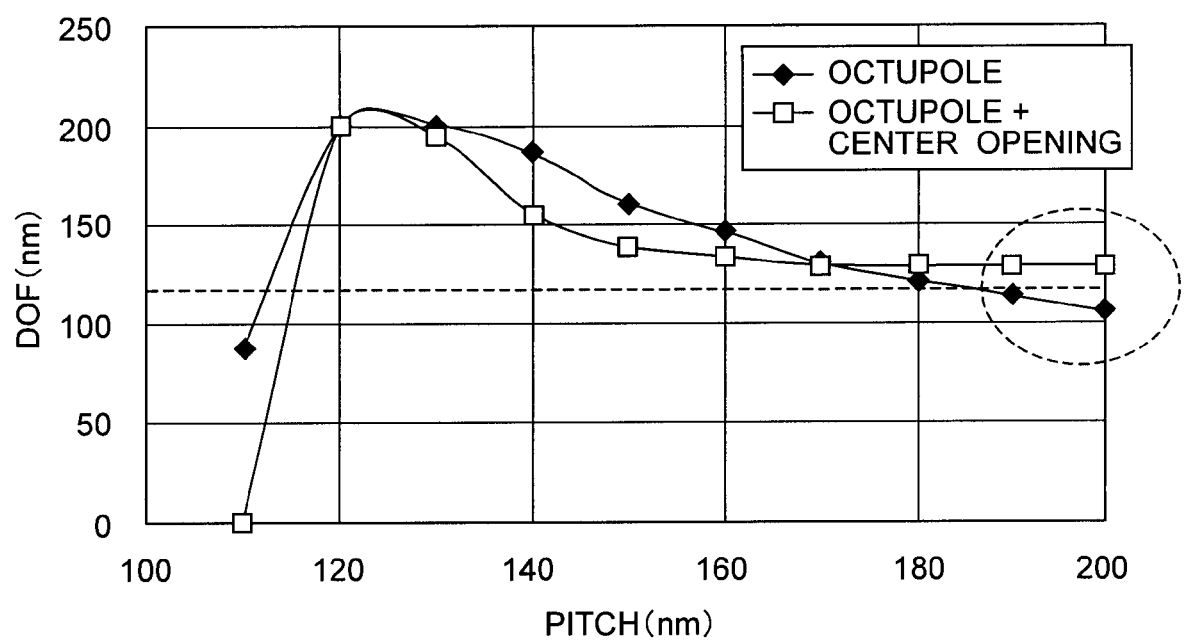
FIG. 12 is a graph showing relationships between the distance between the patterns formed on the wafer in the rectangular lattice configuration and the DOF.

FIG. 12 is a graph showing relationships between the distance between the patterns formed on the wafer in the rectangular lattice configuration and the DOF. The illumination profile referred to as "octupole+center opening" in FIG. 12 is equivalent to the illumination profile shown in FIG. 2, for example.

As shown in FIG. 12, in the case where the hole patterns are formed by the illumination having the octupole illumination profile, although the DOF is deep when the pitch is between 120 nm and 160 nm, the DOF is as shallow as about 100 nm when the pitch is close to 200 nm.

On the other hand, in the case where the hole patterns are formed by the illumination having the "octupole+center opening" illumination profile, the DOF is equal to or greater than 120 nm even when the pitch is between 120 nm and 200 nm.

Therefore, it can be considered that the illumination having the "octupole+center opening" illumination profile allows more stable hole pattern resolution.

As described above, the projection exposure method according to this embodiment can improve the resolution of patterns that are closely arranged with a smaller pitch.

What is claimed is:

1. A projection exposure method that projects the shape of a hole onto a wafer by projecting a diffracted light, which is produced by applying light to a mask having a pattern for forming a hole pattern, onto the wafer through a projection optical system for exposure, wherein, in a plane substantially perpendicular to an optical axis, the light applied to the mask has a first intensity distribution in which the intensity is higher in the vicinity of eight apexes of an octagon centered at the optical axis than in other areas, the mask has a plurality of first opening patterns are arranged in a rectangular lattice configuration having sides parallel to diagonals of the octagon passing through the optical axis, and a plurality of second opening patterns are arranged in a face-centered rectangular lattice configuration having sides parallel to diagonals of the octagon passing through the optical axis, directly opposite two apexes of the octagon lie on the same straight line passing through the optical axis and are opposite to each other at equal distances from the optical axis, and two straight lines passing through adjacent apexes of the octagon intersect with each other at the optical axis at an angle of 45 degrees, and the first diagonal line and the second diagonal line intersect with each other at the optical axis at an angle of 45 degrees.

2. The projection exposure method according to claim 1, wherein the mask further has an auxiliary pattern arranged on at least part of a straight line that is parallel with a diagonal line of the octagon passing through the optical axis and passes through the center of a first opening pattern or a second opening pattern.

3. The projection exposure method according to claim 1, wherein, in the plane substantially perpendicular to the optical axis, the light applied to the mask further has a second intensity distribution in which the intensity is higher in the vicinity of the optical axis than in other areas.

4. The projection exposure method according to claim 2, wherein, in the plane substantially perpendicular to the optical axis, the light applied to the mask further has a second intensity distribution in which the intensity is higher in the vicinity of the optical axis than in other areas.

5. The projection exposure method according to claim 1, wherein the octagon centered at the optical axis is a regular octagon.

6. The projection exposure method according to claim 2, wherein the octagon centered at the optical axis is a regular octagon.

7. The projection exposure method according to claim 3, wherein the octagon centered at the optical axis is a regular octagon.

8. The projection exposure method according to claim 4, wherein the octagon centered at the optical axis is a regular octagon.

9. A projection exposure method that projects the shape of a hole onto a wafer by projecting a diffracted light, which is produced by applying light to a mask having a pattern for forming a hole pattern, onto the wafer through a projection optical system for exposure, wherein, in a plane substantially perpendicular to an optical axis, the light applied to the mask has a first intensity distribution in which the intensity is higher in the vicinity of eight apexes of an octagon centered at the optical axis than in other areas, the mask has a plurality of first opening patterns and a plurality of second opening patterns formed therein, a first auxiliary pattern is arranged on at least part of a straight line that is parallel with a first diagonal line of the octagon passing through the optical axis and passes through the center of a first opening pattern, and a second auxiliary pattern is arranged on at least part of a straight line that is parallel with a second diagonal line of the octagon passing through the optical axis and passes through the center of a second opening pattern, directly opposite two apexes of the octagon lie on the same straight line passing through the optical axis and are opposite to each other at equal distances from the optical axis, and two straight lines passing through adjacent apexes of the octagon intersect with each other at the optical axis at an angle of 45 degrees, and the first diagonal line and the second diagonal line intersect with each other at the optical axis at an angle of 45 degrees.

10. The projection exposure method according to claim 9, wherein, in the plane substantially perpendicular to the optical axis, the light applied to the mask further has a second intensity distribution in which the intensity is higher in the vicinity of the optical axis than in other areas.

11. The projection exposure method according to claim 9, wherein the octagon centered at the optical axis is a regular octagon.

12. The projection exposure method according to claim 10, wherein the octagon centered at the optical axis is a regular octagon.

* * * * *